Patented July 9, 1929.

1,720,074

UNITED STATES PATENT OFFICE.

ROBERT O. FRIEND, OF CHICAGO, ILLINOIS, AND EDWIN M. PARTRIDGE, OF HAMMOND, INDIANA, ASSIGNORS, BY MESNE ASSIGNMENTS, TO THE PERMUTIT COMPANY, OF NEW YORK, N. Y., A CORPORATION OF DELAWARE.

BASE-EXCHANGE SILICATE AND PROCESS OF PREPARING THE SAME.

No Drawing.   Application filed October 29, 1925. Serial No. 65,680.

Our invention relates to the treatment of so-called zeolite, also known as glauconite or greensand, and to the preparation therefrom of a thoroughly washed base-exchange silicate having a very powerful exchange capacity.

Glauconite or greensand is a granular base-exchange silicate found as a mineral and having the property to exchange bases, that is to yield or give up its potassium in exchange for magnesium or calcium. This product both in its natural condition and in various purified or treated forms has been used for the purification of water and for other purposes. Our present invention has for its object to increase the purifying or base-exchange capacity of greensand by a novel treatment which also results in the obtaining of a novel product of distinct characteristics.

Our improved process is distinguished, among others, by the fact that we avoid any temperature that would be high enough to bake the product and further by the treatment of the material with aluminum sulfate after it has been subjected to the action of sodium silicate, and also by conducting the operation under such conditions that an acid character will be imparted to the final solution or bath in which the material is subjected to chemical action before the final washing.

In detail, we proceed as follows:

We take a suitable amount or batch of greensand, say 600 pounds, either in the natural state as coming from the ground or after a preliminary washing and drying effected at the mine. This amount or batch is placed in a suitable vessel and washed with water under simultaneous stirring. The wash water is introduced at or near the bottom of the vessel and flows upwardly, carrying away from the vessel any fine material and impurities which are lighter than the greensand. This washing is carried only to the point where the mineral is thoroughly wet and the bulk of the impurities easily extracted by this treatment has been removed.

The resulting partly purified product is then mixed with 22½ pounds of caustic soda, dry or in aqueous solution, and the whole mass is stirred for a suitable length of time enough water being added so that the mineral will be kept covered with the solution. This treatment may be performed with or without heating; if heating is desired, we prefer to apply it by means of steam injected directly into the water. The vessel in which this step is carried out is preferably open to the surrounding air so that the system is not under pressure, but if desired the vessel could be closed and steam injected under pressure. The caustic soda introduces sodium into the mineral through the replacement of any other exchange bases, calcium, magnesium, potassium, etc., which are present. This replacement effect, however, is not so important as the deflocculating effect which the caustic soda exerts, breaking up any impurities present such as clayey matter and rendering them easily removable by the washing operation which follows immediately.

This washing may be carried out with hard or soft water and is continued until the wash water is fairly clear.

The next step consists in adding 50 pounds of sodium silicate and mixing it with the mineral in the presence of enough water to cover the mineral preferably under the application of heat; care should be taken, however, to keep enough water present for the solution to cover the mineral. Heating helps to make the silicate more fluid and to distribute it throughout the mineral batch.

Thereupon, the batch is well washed with running water, either hard or soft.

A solution of 12 pounds of aluminum sulfate in water is then added and stirred in while heating the mixture, always with enough water to cover the mineral. Owing to the fact that the previously applied charge of sodium silicate has been removed to a very large extent by the subsequent thorough washing, so little of this sodium silicate is present at the time when the aluminum sulfate is added, that the alkaline character of the silicate is insufficient to prevent the aluminum sulfate charge from imparting an acid character to the solution in this aluminum sulfate charge.

Finally, the aluminum sulfate charge is washed from the mineral with water and the mineral is then ready for use in the purification of water or any other purpose for which substances of this type are applicable. If desired, the material may be used moist or if more convenient especially for shipment, it may first be dried so as to remove loose or excess moisture. It will be understood that the aluminum sulfate is employed in excess, that is to say, in greater amount than can be neutralized by the sodium silicate remaining from the preceding step. Aluminum sulfate is definitely acid, it colors methyl-orange indicator red. Probably the result of the treatment is the deposition of a very light coating of hydrated silica from the sodium silicate upon the surface of the grains of the mineral. This coating allows the ready passage of ionic substance through it and allows a rapid softening action to occur. While we have been unable so far to determine with certainty the exact nature of the coating, there is no doubt that such coating has the properties just referred to, and that it prevents turbidity and the throwing off of color, in other words, the water or other liquid treated with the resulting product will remain clear and colorless, or at least unchanged in these respects. Of course, the extent of acidity is guarded by the so-called buffer action of the aluminum sulfate so that it never becomes as strong an acid as a free hydrochloric or sulfuric acid would be.

An important result of this final aluminum sulfate treatment followed by washing is that the finished mineral will not impart phenolphthalein alkalinity to any water coming in contact with it. Greensand processed by methods ending with an alkaline treatment will frequently add such alkalinity to water coming in contact with it, after long continued washing has taken place. This phenolphthalein alkalinity is often objectionable when such mineral is placed in use as a softening agent.

A very important advantage of our invention resides in the fact that the material processed in accordance with our improvement does not at any time impart caustic alkalinity to the water treated therewith, and furthermore, mineral treated according to our process will not add color or turbidity to water left standing in contact therewith for long periods of time. Untreated greensand has the objectionable property of contaminating water brought in contact with it, particularly soft water which is allowed to stand on such greensand. The contaminated water is most unsightly and leaves the user of the equipment containing the greensand which does so contaminate water, under the impression that the mineral is rapidly going to pieces. While certain prior treatments improve the character of greensand in this respect, our present process yields results far superior to any prior process of which we have knowledge. For practical purposes it may be said that the mineral which results from our treatment will leave the water brought in contact with it, as free from color and turbidity as it was before such contact.

Various changes in the specific form of treatment and product described may be made within the scope of the claims without departing from the spirit of the invention.

We claim:

1. The process of preparing a base-exchange silicate which comprises treating a batch of greensand with sodium silicate and washing the batch thoroughly and thereupon adding to the batch aluminum sulfate in an amount greater than can be neutralized by the remnant of sodium silicate, so as to impart an acid character to the solution.

2. The process of preparing a base-exchange silicate which comprises treating a batch of greensand with sodium silicate under application of heat and then adding to the thus treated batch of greensand aluminum sulfate solution in an amount sufficient to establish an acid character in the supernatant solution.

3. The process of preparing a base-exchange silicate which comprises treating a batch of greensand with sodium silicate under application of heat, then washing the batch to remove most of the sodium silicate and subsequently treating the washed batch with aluminum sulfate in an amount greater than can be neutralized by the remnant of sodium silicate, so as to impart an acid character to the solution.

4. The process of preparing a base-exchange silicate which comprises subjecting a batch of greensand to a preliminary washing, then adding caustic soda, then again washing the batch, thereupon adding sodium silicate under application of heat, thereupon again washing the thus treated batch and finally adding an aluminum sulfate solution in an amount greater than can be neutralized by the remnant of sodium silicate, so as to impart an acid character to the solution.

In testimony whereof we have hereunto set our hands.

ROBERT O. FRIEND.
EDWIN M. PARTRIDGE.